United States Patent Office 3,655,701
Patented Apr. 11, 1972

3,655,701
PRODUCTION OF CARBOXYLIC ACID ESTERS BY REACTION OF SODIUM CARBOXYLATES WITH ALKYL HALIDES USING CERTAIN GLYCOLS AND ETHERS AS DILUENTS
Bernard J. Darre, Baton Rouge, La., assignor to Ethyl Corporation, New York, N.Y.
No Drawing. Filed Apr. 9, 1969, Ser. No. 814,796
Int. Cl. C07c 67/00, 67/02
U.S. Cl. 260—410.9 R          17 Claims

ABSTRACT OF THE DISCLOSURE

A process is disclosed for producing esters in good yield and at low cost from inexpensive reactants. The process is characterized by the absence of deliberately added catalyst materials. It has been discovered that certain diluents will permit a reaction between certain inexpensive organic reactant materials without requiring the presence of a deliberately added specific catalyst material.

BACKGROUND OF THE INVENTION

Field of the invention

The invention relates to the production of esters of organic acids for use as lubricants, plasticizers, emollients, cosmetics, chemical intermediates and polymeric materials of high molecular weight.

Description of the prior art

Esters can be produced by several reactions from various different raw materials. Two reactions are of particular importance; one, the reaction of metal carboxylates and alkyl halides; two, the reaction of acids and alcohols. The present application relates to the first reaction.

With regard to the first reaction process for esterification, the reaction of metal carboxylates and organic halides has been known generally for a long time; however, in all the known prior art connected with this reaction it has been necessary to use certain highly reactive starting materials that are expensive and difficult to handle such as silver carboxylates or allylic and benzylic halides. Other prior art processes require complex catalyst systems. Such are typified by the reaction of organic acids with alkyl halides in the presence of a tertiary amine and an inorganic iodide as an "exotic" catalyst system. The use of catalysts or highly reactive starting materials in such reactions is undesired for several reasons, one being the difficulty and expense of removal from the products, another being the cost of the catalyst itself.

SUMMARY

In accordance with the present process, esters are produced in excellent yield from inexpensive raw materials in the absence of a deliberately added catalyst. An important aspect of the present invention is the use of certain diluent materials.

The present application describes a process for producing carboxylic acid esters which comprises, reacting a sodium carboxylate with an alkyl halide in which the halide is chloride or bromide, or both, in liquid phase at an elevated temperature at which esterification occurs, said process being conducted in the absence of deliberately added catalyst in a liquid reaction medium consisting essentially of (a) a compound having the formula ROR' wherein R is alkyl, alkoxyalkyl, alkoxyalkoxyalkyl, omega-hydroxyalkyl, omega-hydroxyalkoxyalkyl; R' is equal to H, akyl, alkoxyalkyl, alkoxyalkoxyalkyl, omega-hydroxyalkyl, omega-hydroxyalkoxyalkyl, with the proviso that both R and R' are not alkyl or (b) cyclic hydrocarbyl ethers having 1 or 2 non-adjacent ether oxygen atoms in a 5- or 6-membered ring or (c) any mixture of 2 or more of the foregoing.

In other words, this invention utilizes as solvents alcohols, alkylene glycols, mono- or di-ethers of alkylene glycols, mono- or di-ethers of polyalkylene glycols, furans, pyrans, dioxolanes, dioxanes, and the like, or any mixture of the foregoing materials.

Typical alcohols include straight or branched chain primary, secondary and tertiary alcohols, such as methyl alcohol, ethyl alcohol, isopropyl alcohol, n-butyl alcohol, sec-butyl alcohol, isobutyl alcohol, t-butyl alcohol, pentyl alcohol, hexyl alcohol, and 2-ethyl-hexanol, and similar alkanols, that is, those containing up to about 8 carbon atoms in the molecule.

Typical glycols include ethyene glycol, propyene glycol, 1,2-butane diol, 1,3-pentane diol, trimethylene glycol, tetramethylene glycol, pentamethylene glycol, hexamethylene glycol, diethylene glycol, triethylene glycol and similar glycols, that is, glycols containing up to about 8 carbon atoms in the molecule. Generally speaking, glycols with terminal hydroxyl groups are preferred and glycols with adjacent hydroxyl groups are useful but less desired.

Other typical solvents are the dimethyl ether of diethylene glycol ($CH_3OCH_2CH_2OCH_2CH_2OCH_3$), the diethyl ether of triethylene glycol, the monomethyl ether of diethylene glycol ($HOCH_2CH_2OCH_2CH_2OCH_3$), and the dimethyl ether of tetraethylene glycol.

Other typical solvents are tetrahydrofuran and similar compounds containing substitution with lower alkyl groups up to about 8 carbon atoms such as 2-methyl tetrahydrofuran and 2,5-dimethyl tetrahydrofuran. Included also are derivatives of furan such as tetrahydrofurfuryl methyl ether, tetrahydrofurfuryl ethyl ether and tetrahydrofurfuryl butyl ether.

Other typical solvents include similar compounds of pyran such as tetrahydropyran, dihydropyran and similar methyl and ethyl ring substituted derivatives.

Typical solvents include dioxolanes, particularly the 1,3-dioxolanes such as 1,3-dioxolane, 2-methyl-2-ethyl-1,3-dioxolane, 2-methyl-1,3-dioxolane, 2-ethyl-1,3-dioxolane, and so forth.

Other typical solvents are dioxanes such as 1,4-dioxane and substituted alkyl derivatives thereof.

The materials reacted include mono- or polysodium carboxylates

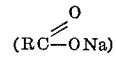

whose carbon skeletal constituency corresponds to the mono-, di-, or polybasic "acid" structure e.g.

of desired ester products. R in this representation is, generally, hydrogen or alkyl of up to about 23 carbon atoms, preferably of unbranched, branched, primary, secondary, tertiary, or cyclic skeletal configuration. Particularly desired are those sodium carboxylates in which RC is normal alkyl of 12–16 carbon atoms per molecule.

The sodium carboxylates are reacted with alkyl halides (RX) in which the halide (X) is chloride or bromide, or both. Alkyl halides used are those in which the alkyl group (R) corresponds to the "alcohol" component (—OR) of desired ester products. R in this instance is generally alkyl of up to about 24 carbon atoms, preferably of unbranched, branched, primary, secondary, tertiary or cyclic skeletal configuration. Particularly desired are those alkyl halides in which R is normal alkyl with terminal attachment to the halogen. Where difunctionality of the "alcohol" constituent is desired, alpha-omega dihalides $(X-C(C)_nC-X)$ are preferred. Such are useful for example in conjunction with disodium carboxylates

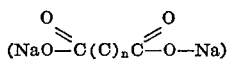

to produce polyesters. In this instance $(C)_n$ represents a skeletal configuration or chain of from zero up to about 22 connected methylene groups ($-CH_2-$).

The most preferred alkyl halides are primary chlorides with up to 6 carbon atoms per alkyl group such as methyl chloride and ethyl chloride.

The foregoing materials are used in pure or mixed forms, particularly with regard to the R groups of the different classes of reactants.

In preferred embodiments of the principles of the present invention, a sodium carboxylate such as sodium laurate is reacted with an alkyl halide such as methyl chloride, dodecyl chloride or methyl bromide in the presence of a preferred diluent, typically methanol or tetrahydrofuran, and in the absence of any deliberately added catalytic material. The reaction of the typified materials produces methyl or dodecyl laurate ester product and coproduct sodium chloride or bromide. The sodium chloride is readily removable from the ester plus diluent by filtration since the salt is insoluble in the environment and therefore precipitates. The diluent is then removed from the ester typically by vaporization of the diluent.

The reaction is performed with stirring at an elevated temperature which is below the decomposition point of the materials involved. A typical temperature range is 100–300° C., preferably from about 150 to about 250° C., under autogenous pressure for a reaction period of from about 1 to about 12 hours, preferably 3–9 hours, typically 6 hours.

In the typical case, the reactants are employed in proportions from about stoichiometric to a moderate excess of the alkyl halide reactant, typically ranging from about 1 to 1 to about 6 to 1 alkyl halide reactant to metal carboxylate reactant on a mol basis. Actually stoichiometric is subject to some variation when dealing with certain difunctional molecules, particularly when the desired conversion is to an intermediate product. For example, if one seeks to produce a halo-ester from a dihalo reactant, stoichiometric for that reaction is different from stoichiometric for the production of a diester from the same dihalo reactant.

The amount of diluent used is not extremely critical, although it is preferred that the minimum diluent used be enough to provide at least a partially homogeneous fluid system, preferably a solution, readily stirred as a liquid mass. In general, it is preferred to use about 2–5 times such minimum amount of diluent. This requires on a weight basis from about 1 part diluent per part of reactants up to about 50 parts diluent per part of reactants. A preferred range is from about 1 to 1 to about 10 to 1 diluent to reactants by weight. A typical ratio is two parts of diluent for each part of total reactants on a weight basis. Another typical ratio is 4 parts of diluent for each part of reactants on a weight basis.

Typical simple aliphatic mono- and polyesters produced in accordance with the present invention are methyl laurate, ethyl laurate, 2-chloroethyl laurate, isopropyl laurate, dimethyl adipate, dihexyl succinate, diethyl sebacate, and dimethyl dodecanedioate. Other typical esters produced in accordance with the present invention are aromatic esters such as methyl benzoate, ispropyl naphthenate, substituted aromatics, aromatic carboxylic esters such as methyl paranitro benzoate, 3-chloro-1-naphthoate, dihexyl phthalate.

Other typical esters products include hetero aromatic carboxylic acid esters such as butyl pyridine carboxylate, ethyl thiophene carboxylate.

Other suitable esters are hetero aliphatic carboxylates such as trimethyl nitrilo acetate, methyl glutarate.

Other suitable esters are eicosyl eicosanate, dieicosyl adipate, trimethanol propane triacetate, pentaerythritol tetrabutanoate.

Other suitable esters are complex esters, such term being used to differentiate chains wherein more than three starting molecules are reacted so as to become connected together in sequences of four or more starting molecules as wherein the reactants are bifunctionally reactive (dihalides plus dicarboxylic acid soaps or certain halocarboxylic acid soaps).

Typical metal carboxylate reactant materials used in the present process are sodium laurate, sodium acetate, sodium phthalate, sodium benzoate, sodium dipyridine carboxylate, sodium hexanoate.

Typical organic halides used in performing the process of the present invention are methyl chloride, ethyl chloride, isopropyl chloride, hexyl chloride, octyl bromide, 1,2-dichloro ethane. Methyl chloride and ethyl chloride are preferred.

Typical bifunctionally reactive reactants useful in the present process for producing complex esters are sodium phthalate and 1,2-dichloro ethane, sodium adipate and 1,4-dichloro butane.

Example I.—A mixture containing 32.5 grams, 0.14 mols, of mixed sodium salts of coconut range carboxylic acids (65 wt. percent $C_{12}$, 25 percent $C_{14}$, 10 percent $C_{16}$), 75 ml. of tetrahydrofuran and 30 grams, 0.59 mol, of methyl chloride was heated and stirred at 200° C. for 6 hours in an autoclave. After the reaction, the mass was allowed to cool and then it was filtered to remove crystallized salt and then evaporated to dryness to remove the diluent. The residue of 29.5 grams analyzed as 95 percent of methyl esters of the coconut range acids (methyl coconoate). The yield was 95 percent by weight of the theoretical stoichiometric yield to "methyl esters of coconut range acids." On analysis in further detail, the ester value was 2.47 mg. KOH per gram, which compares to a theoretical value of 2.48 mg. KOH per gram for the stoichiometric product. The infrared spectrum of the sample was identical to that of an authentic sample of commercial grade methyl "coconoate" (95 percent pure) of similar molecular weight distribution.

Example II.—The foregoing example was repeated using sodium laurate, ethyl chloride and methanol. The yield was 86 percent of the theoretical amount. Analysis of the ester corresponded substantially to that of the previous example based on theoretical.

Example III.—Example I was repeated using sodium laurate and 1,2-dichloro ethane in tetrahydrofuran. The mixture contained 15.5 grams (0.07 mole) of sodium laurate, 6.93 grams (0.07 mole) of 1,2-dichloro ethane and 75 ml. of THF. The mixture was stirred in the autoclave and heated at a temperature of 200° C. for 6 hours. At the conclusion of the time, the reaction mass was allowed to cool, filtered to remove by-product salt, and then evaporated to dryness to remove the solvent yielding 13.8 grams of a liquid which solidified upon standing. This material was distilled under vacuum of 0.05 ml. mercury absolute yielding 6.9 grams of overhead material which contained 2-chloro ethyl laurate and a small amount (2 percent by weight) of lauric acid. The residue from the distillation was 5.59 grams and was identified as dilauryl ester of ethylene glycol. The stoichiometry was arranged to illustrate incomplete conversion of halo constituency to ester (dilauryl).

Example IV.—Sodium phthalate and 1-chloro hexane are reacted in methanol at 200° C. to give dihexyl phthalate. Excellent results are obtained.

Example V.—Sodium acetate and 1-octyl chloride are reacted in tetrahydrofuran at 200° C. to give octyl acetate. Excellent results are obtained.

Example VI.—Sodium adipate and 1-eicosyl chloride are reacted in the dimethyl ether of diethylene glycol at 225° C. to give dieicosyl adipate. Excellent results are obtained.

Example VII.—Sodium laurate and isopropyl bromide are reacted in dioxane at 185° C. to give isopropyl laurate. Excellent results are obtained.

Example VIII.—Foregoing examples are repeated with the following solvents with excellent results and high yields: Ethyl alcohol, isopropyl alcohol, normal butanol, isobutanol, sec-butanol, tertiary butanol, pentyl alcohol, hexylalcohol, 2-ethyl hexanol, tetrahydrofuran, 2-methyl tetrahydrofuran, 2,5-dimethyl tetrahydrofuran, dihydropyran, tetrahydropyran, 1,3-dioxolanes, 1,4-dioxane, 2-methyl-2-ethyl - 1,3 - dioxolane, the dimethyl ether of diethylene glycol, the diethyl ether of triethylene glycol, the monomethyl ether of diethylene glycol, the dimethyl ether of tetraethylene glycol. The foregoing typical solvents are used individually and in mixtures of two or more thereof. Excellent results are obtained.

Example IX.—The foregoing examples are repeated with solvents of the following classifications. Excellent results are obtained.

ROH
ROROH
ROROR
ROROROH
RORORO R
ROROROROH
ROROROROR
RORORORORO R
ROROROROROH
HOROROROROH
HORORORO H
HOROROH
HOROH wherein:

R's between O's are

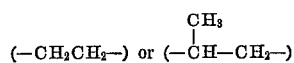

for mixtures.
Other R's are (CH₃—) or (CH₃CH₂—) or mixtures.

APPENDIX

Prior art is described, for example, in:

Hennis, H. E., Easterly, J. P., Jr., Collins, L. R., Thompson, L. R., Ind. Eng. Chem. Prod. Res. Develop. 6, 193 (1967).
Hennis, H. E., Thompson, L. R., Long, J. P., Ind. Eng. Chem. Prod. Res. Develop. 7, No. 2, p. 96 (1968).
Mills, R. H., Farrar, M. W., Weinkauff, O. J., Chem. Ind. (London), 1962, p. 2144.

I claim:
1. A process for producing carboxylic acid esters which comprises
reacting a sodium carboxylate with an alkyl halide in which the halide is chloride or bromide, or both, in liquid phase at an elevated temperature at which esterification occurs, said process being conducted in the absence of deliberately added catalyst in a liquid reaction medium consisting essentially of
(a) a compound having the formula

ROR' wherein R is alkoxyalkoxyalkyl, omega-hydroxyalkyl or omega hydroxyalkoxyalkyl; and R' is equal to H, alkyl, alkoxyalkyl, alkoxyalkoxyalkyl, omega-hydroxyalkyl, or omega-hydroxyalkoxyalkyl, or
(b) a cyclic hydrocarbyl ether having 1 or 2 non-adjacent ether oxygen atoms in a 5- or 6- membered ring or
(c) any mixture of 2 or more of the foregoing.

2. A process for producing carboxylic acid esters which comprises reacting a sodium carboxylate with an alkyl halide in which the halide is chloride or bromide, or both, in liquid phase at an elevated temperature at which esterification occurs, said process being conducted in the absence of deliberately added catalyst in a liquid reaction medium consisting essentially of a cyclic hydrocarbyl ether having 1 or 2 non-adjacent ether oxygen atoms in a 5- or 6-membered ring.

3. A process for producing carboxylic acid esters which comprises reacting a sodium carboxylate with an alkyl halide in which the halide is chloride or bromide, or both, in liquid phase at an elevated temperature at which esterification occurs, said process being conducted in the absence of deliberately added catalyst in a catalyst in a liquid reaction medium consisting essentially of tetrahydrofuran or tetrahydropyran or a substituted tetrahydrofuran or tetrahydropyran wherein the substitution is limited to lower alkyl groups having up to about 8 carbon atoms each.

4. A process for producing carboxylic acid esters which comprises reacting a sodium carboxylate with an alkyl halide in which the halide is chloride or bromide, or both, in liquid phase at an elevated temperature at which esterification occurs, said process being conducted in the absence of deliberately added catalyst in a liquid reaction medium consisting essentially of tetrahydrofuran, 2-methyl tetrahydrofuran, 2,5-dimethyl tetrahydrofuran, tetrahydrofurfuryl methyl ether, tetrahydrofurfuryl ethyl ether, tetrahydrofurfuryl butyl ether, tetrahydropyran, dihydropyran, 1,3-dioxolane, 2-methyl-2-ethyl-1,3 - dioxolane, 2-methyl-1,3-dioxolane, or 2-ethyl-1,3-dioxolane, or two or more thereof.

5. The process of claim 3 wherein the solvent is tetrahydrofuran or substituted tetrahydrofuran wherein the substitution is with alkyl groups only, such alkyl groups having up to about 8 carbon atoms each.

6. The process of claim 4 wherein the solvent is tetrahydrofuran.

7. The process of claim 1 wherein the solvent is ethylene glycol.

8. The process of claim 1 wherein the solvent is the dimethyl ether of diethylene glycol.

9. The process of claim 3 wherein the solvent is tetrahydropyran or substituted tetrahydropyran wherein the substitution is with alkyl groups only, such alkyl groups having up to about 8 carbon atoms each.

10. The process of claim 4 wherein the solvent is tetrahydropyran.

11. The process of claim 1 wherein the solvent is 1,4-dioxane

12. The process of claim 4 wherein the solvent is 1,3-dioxolane.

13. The process of claim 4 wherein the halogen of the organic halide is chlorine.

14. The process of claim 4 wherein the alkyl halide is an alkyl halide containing from about 1 to about 24 carbon atoms.

15. The process of claim 4 wherein the alkyl halide is an alkyl halide containing from about 1 to about 6 carbon atoms.

16. The process of claim 4 wherein the sodium carboxylate contains only sodium, carbon, hydrogen and oxygen and has from 1 to about 24 carbon atoms per molecule.

17. The process of claim 16 wherein the sodium carboxylate contains from about 12 to about 16 carbon atoms per molecule.

References Cited

UNITED STATES PATENTS

| | | | |
|---|---|---|---|
| 1,459,971 | 6/1923 | Carter et al. | 260—493 |
| 2,861,098 | 11/1958 | Di Sanza et al. | 260—493 |
| 3,123,628 | 3/1964 | Closson | 260—410.9 |

ELBERT L. ROBERTS, Primary Examiner

D. G. RIVERS, Assistant Examiner

U.S. Cl. X.R.

260—75 H, 408, 410.6, 295 R, 332.2 C, 469, 471 R, 475 P, 475 R, 476 R, 482 P, 485 G, 48 R, 493